Jan. 31, 1961 H. M. OGLE 2,969,674
MEASURING APPARATUS AND METHOD
Filed Jan. 8, 1957
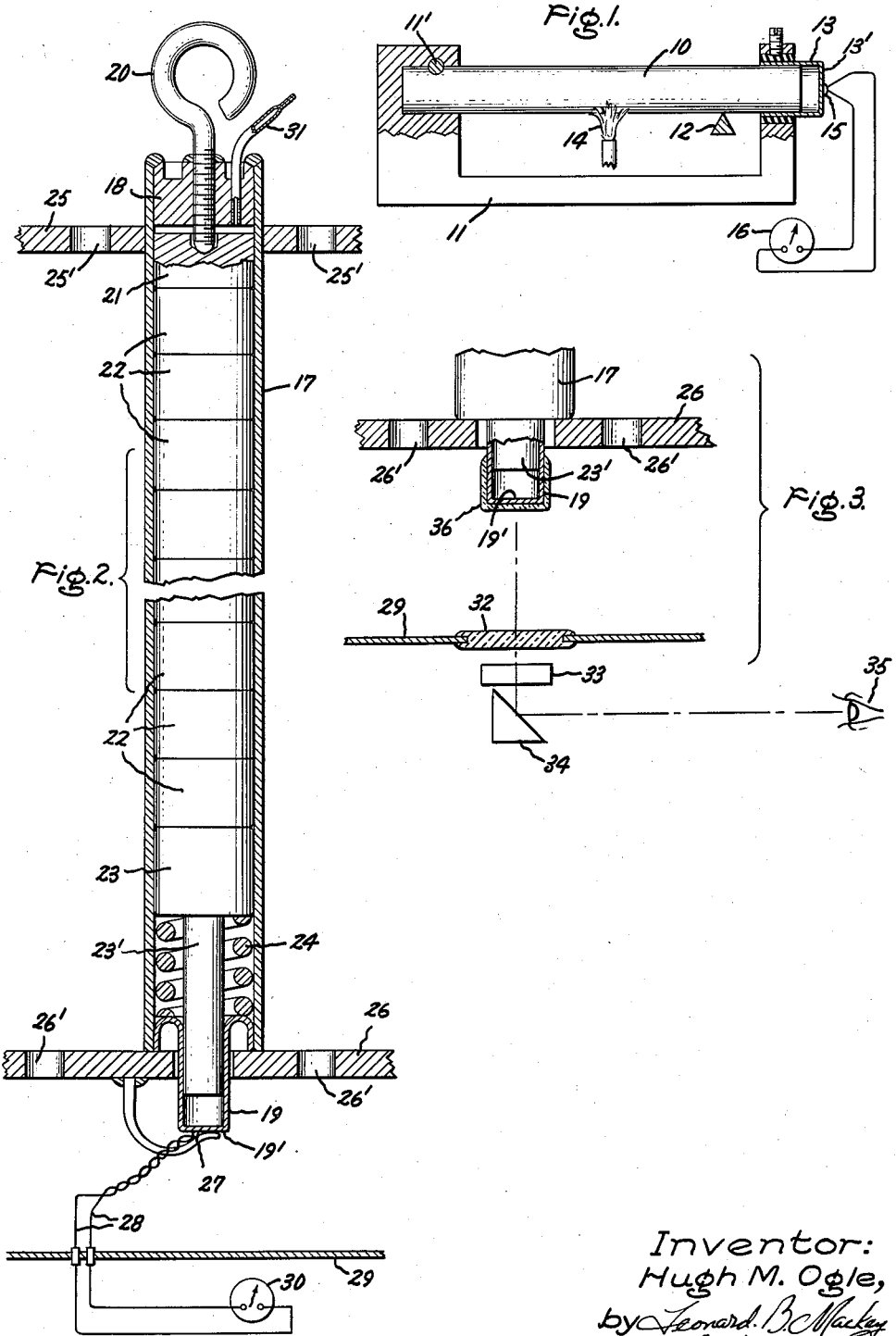
Inventor:
Hugh M. Ogle,
by Leonard B. Mackey
His Attorney.

United States Patent Office 2,969,674
Patented Jan. 31, 1961

2,969,674

MEASURING APPARATUS AND METHOD

Hugh Malcolm Ogle, Palo Alto, Calif., assignor to General Electric Company, a corporation of New York Filed Jan. 8, 1957, Ser. No. 633,152

8 Claims. (Cl. 73—359)

This invention relates to methods and apparatus for measuring dimensions of an object.

While this invention may be practiced in connection with a wide variety of apparatus and for varied purposes, it is ideally suited for use in connection with nuclear reactor equipment and is particularly described in this connection.

A nuclear reactor generally includes a plurality of nuclear fuel elements incorporating nuclear fuel, including fissionable material; i.e., material which, in proper quantities and configurations, fissions to produce sufficient neutrons to sustain a chain reaction. The nuclear fuel is protected by a surrounding jacket or cladding. As the fissionable material fissions, or burns up, characteristic changes occur in the nuclear fuel which eventually necessitate removal and replacement of fuel elements. However, fuel burnup is not uniform; i.e., some fuel elements must be replaced before others.

Therefore, it is particularly desirable to monitor the characteristics of the individual fuel elements in the reactor core. As will be subsequently described, changes in characteristics of fuel elements such as occur during nuclear fuel burnup in a reactor may be detected by changes in the dimensions of the fuel elements.

Also, it is desirable that any monitoring system function when the reactor is producing power so as to provide a continuous indication of the condition of the fuel elements and because many defects such as minute ruptures in the cladding of a fuel element are often not detectable after the fuel element has cooled off. Therefore, since fuel elements in an operating reactor cannot be approached closely, it is desirable to provide a remote monitoring system providing an indication of the condition of each fuel element in the reactor.

Among the more obvious methods and apparatus for measuring one or more dimensions of an object remotely are inductive and capacitive systems wherein a dimension of the object is indicated by inductive or capacitive reactance. Alternatively, dimensions may be indicated by means of a mechanical linkage physically or hydraulically coupled to the object to be measured. Such apparatus is generally characterized by relatively rapid response and relatively complicated and often expensive equipment.

However, if capacitive or inductive apparatus is utilized, care must be exercised in selecting materials that will withstand the effects of reactor coolants and nuclear radiation. Mechanical measuring apparatus requires physical passages through the reactor pressure vessel, thereby complicating the fabrication of reactor equipment. The practice of this invention overcomes the inherent limitations of such prior art apparatus by providing a thermal indication of dimension.

Therefore, it is an object of this invention to provide improved methods and apparatus for measuring dimensions of an object.

Another object of this invention is to provide improved apparatus and methods providing a thermal indication which is a function of a dimension of an object.

It is also an object of this invention to provide in a nuclear reactor economical methods and apparatus for monitoring the condition of nuclear fuel.

According to an aspect of this invention, at least one dimension of an object is measured by establishing the resistance to heat flow between the object and temperature indicating apparatus in accordance with a dimension of the object to provide a temperature at the indicating apparatus which is a function of a dimension of the object.

Other objects of this invention and important aspects thereof will become apparent from the following specification and claims when read in conjunction with the figures of the drawing wherein:

Figure 1 is a diagrammatic illustration of the practice of this invention;

Figure 2 illustrates apparatus embodying the practice of this invention to monitor the condition of a nuclear reactor fuel element.

Figure 3 illustrates another embodiment of a nuclear reactor fuel element monitoring system incorporating the practice of this invention.

Figure 1 illustrates thermally expansive object 10 retained in member 11 by pin 11'. Object 10 is slidably supported by member 12 and is oriented in heat transfer relationship with respect to thermally conductive member 13. Member 13 is insulated from 11 and is maintained in fixed relationship with respect to the left hand end of object 10. Heat source 14 is located in proximity to object 10 and the temperature of conductive member 13 is detected by thermocouple 15 applied to end face 13' to provide an indication at meter 16.

In operation, heat source 14 supplies heat to object 10 causing the object to change in dimension. The resistance to heat flow between object 10 and thermally conductive member 13 is established by the extent to which object 10 extends into thermally conductive member 13. The temperature detected by thermocouple 15 and readable on meter 16 is thereby a function of the resistance to heat flow between object 10 and conductive member 13. Thus, if other thermal conditions are known, changes in the dimensions of object 10 can be detected by a change in the temperature of the thermally conductive member 13. Consequently, meter 16 provides a measure of at least one dimension of object 10.

For example, if object 10 has a positive coefficient of thermal expansion, the right hand end thereof extends a greater distance into 13, as a result of heat applied by 14, and meter 16 indicates a higher temperature reading at end face 13'.

It will be readily apparent that object 10 may be composed of one or a plurality of materials and that it may have a positive or a negative thermal coefficient of expansion. Also, source of heat 14 can, without departing from this invention, be applied to thermally conductive member 13 to heat object 10. For example, it might not be convenient or desirable to apply heat directly to object 10. That is, it might be desired to determine the position of the right hand end of object 10 when it is not acting as a source of heat.

In a preferred form, the wall thickness of thermally conductive member 13 should be relatively thin with respect to the cross-section dimension of object 10. If these conditions are observed and suitable heat flow is established between objects 10, 13, and their surroundings, any change in dimension of object 10 equal to or greater than the wall thickness will be detected readily by thermocouple 15 and with sensitive measuring apparatus, changes in dimension of object 10 of less than the wall thickness of thermally conductive member 13 can be detected.

In this diagrammatic illustration of the practice of this invention, the temperature is detected by means of a conventional thermoelectric device, for example, a thermocouple. However, it will be readily apparent that other means may be utilized to detect the temperature of the end face 13' of thermally conductive member 13. For example, visual observation of the brightness or color of the end face may be utilized. If the temperatures utilized are relatively low, apparatus for detecting wave lengths outside of the visible spectrum may be utilized, for example, an infrared detector might be utilized to detect the temperature of end face 13'.

Before describing the fuel element and monitoring system illustrated in Figure 2, it is believed desirable to provide a brief background as to the particular applicability of the practice of this invention to the monitoring of fuel elements in a nuclear reactor. The cost of fuel elements in a nuclear reactor represents a major portion of the reactor operating expense. Thus, it is desirable to achieve optimum burnup of the fissionable material contained in a fuel element. In order to accomplish this, it is generally necessary to keep accurate records of the utilization of the reactor and to compute the fissionable material burnup by integrating the heat produced over the operating history of the reactor. Since the flux distribution throughout a typical reactor core generally is not uniform, it is desirable to integrate the history of each fuel element separately in the reactor core.

In addition to fuel burnup, rupture of the cladding of the fuel element presents a definite hazard during the life of the reactor and this hazard tends to become acute during the latter stages of the life of an individual fuel element. If adequate monitoring means are not available, fuel elements are frequently replaced before optimum fuel burnup has occurred in order to minimize the likelihood of fuel element rupture.

Consequently, in order that the most economical fuel cost can be achieved, a monitoring system is required which permits a reactor operator to determine relative fuel burnup of individual elements and to locate quickly a ruptured fuel element if rupture occurs. Obviously, it is important that any monitoring system be able to function when the reactor is producing power since many minute ruptures in the cladding of a fuel element and other anomalies may not be detected readily after a fuel element has cooled off.

The practice of this invention to monitor nuclear fuel elements is based upon the fact that fuel burnup effects a dimensional change in the fuel itself. This change in dimension can be measured and used as an indication of burnup of the fissionable material. Thus, a change in fuel element dimensions can be detected by the change in temperature of a temperature sensitive device oriented in heat transfer relationship with the fuel. In view of the foregoing, it will be readily apparent that this invention is ideally suited for use for monitoring nuclear fuel elements.

Figure 2 illustrates a fuel element comprising fuel element casing or cladding 17, upper plug 18, and, at the lower end of the fuel element, cup 19. A typical fuel element may be approximately 9 feet long by ¾ inch in diameter. A lifting and adjusting screw eye 20 is threaded through plug 18 and engages spacer 21. A plurality of fuel pellets 22 are supported by thermally conductive plug 23 which in turn is supported by spring 24. The fuel pellets 22 may be very much smaller than those illustrated in Figure 2. Plug extension 23' extends into and is oriented in heat transfer relationship to cup 19. The fuel element is supported in the reactor by upper reactor support member 25 having coolant passages 25' therein and by lower reactor support member 26 which includes coolant passages 26'. Spring loaded thermocouple member 27 engages end face 19' of cup 19 and is electrically connected by electrical leads 28 passing through reactor enclosure 29 to meter 30.

Fuel pellets 22 may consist of sintered pills of fissionable material such as $UO_2$ which can be formed rapidly in a pill press. Alternatively, metallic uranium formed in a single or plurality of members may be utilized. In each instance, the uranium may be in natural form or enriched with fissionable isotopes depending upon the design of the reactor in which the fuel elements are to be used. The cladding 17 consists of a zirconium tube. Alternatively, the tube may be made of aluminum, stainless steel, or other suitable material for cladding nuclear fuel. The upper plug and lower cup are welded in place after insertion of the components of the fuel element within the zirconium tube.

In the lower end of the fuel element, plug 23 may consist of any thermally conductive material, for example, the same material as tube 17. Spring 24 is formed from any satisfactory radiation-resistant material. Cup 19 is formed of material relatively thin as compared to the cross-sectional dimension of plug extension 23' and, in order to simplify fabrication, is preferably formed of the same material as the tube 17. Screw eye 20 is used to set the initial clearance during assembly and is then welded to upper plug 18. In a typical fuel element, the entire tube is evacuated after welding operations have been completed and a small amount of eutectic fusible alloy, for example, Wood's metal or other metal which is liquid at the operating temperature of the reactor, is introduced through tube 31. The assembly is then filled through tube 31 with helium or other satisfactory gas and sealed off. The chief purpose of the alloy and the gas is to provide a good heat flow path between pellets 22 of $UO_2$ and the inside wall of the zirconium tube. The inclusion of low melting point metal and gas are not essential to the practice of this invention or to the fabrication of many forms of nuclear fuel elements and are mentioned only by way of illustration of a typical fuel element fabrication.

The illustrated fuel element is particularly suited for a top loading reactor designed for vertical fuel element loading and unloading through a deep water shield; however, a fuel element which could be monitored at the top, could be fabricated with plug 23 and cup 19 at the top of the fuel element in which case spring 24 would not be necessary to the practice of the invention. Alternatively, fuel elements can be inserted horizontally into a reactor core.

The practice of this invention to monitor the condition of nuclear fuel is predicated on a change of dimension in the total length of the nuclear fuel within the fuel element during the useful life of the fuel. For example, in a typical fuel element, an expansion of the order of between one-half and one percent may be expected. Thus, a fuel element having approximately 9 feet of $UO_2$ may be expected to expand approximately one inch.

Referring now to the fuel element illustrated in Figure 2, as the fuel is consumed or burned up it expands and forces plug extension 23' further into cup 19. This reduces the resistance to heat flow between the fuel and the cup. Assuming a constant ambient coolant temperature in the vicinity of the cup 19, the temperature of cup face 19' increases as the resistance to heat flow between 23' and 19 decreases. Thus, as the fissionable material in the fuel element is burned up, the temperature of face 19' increases and the temperature thereof is detected by thermocouple 27 and read on meter 30.

The practice of this invention also indicates a rupture of the fuel element jacket since rupture of the zirconium tube usually results in loss of some of the low melting point alloy. This results in an increase in the temperature of the $UO_2$ with respect to the temperature of the zirconium tube 17 and this increase in temperature causes a relative thermal expansion of the $UO_2$ with respect to the tube 17 and a corresponding detectable increase in the temperature at the bottom of the tube. In this way, rupture of the cladding material; i.e., the zirconium tube 17, causes an indication similar to that caused by burnup of the fuel. The indication caused by a typical failure of the cladding may result in approximately one-third of the expansion expected to occur during the useful life of the fissionable material and such a relatively large change is readily detectable by an increase in temperature of face 19'.

It is readily apparent that the practice of this invention, in connection with monitoring the condition of nuclear fuel elements, is ideally suited to detect properties of the fuel element which are manifested in a change in dimension within the fuel element jacket. For example, excessive heating of the fuel element is readily detectable in the practice of this invention both as a result of reduced resistance to heat flow due to further extension of 23' into 19 and as a result of higher fuel temperature. Also, leakage of coolant into the fuel element is customarily accompanied by expansion of the fuel which can be detected by increased temperature at face 19'.

Thus, it is apparent that this invention may be used to detect changes in the properties of an object or a material which changes are characterized by a change in temperature and/or a change in dimension of the object or material.

In the adaptation of this invention to a reactor, the ends of the fuel elements may be individually monitored from a remote location to provide a convenient indication of the condition of each fuel element in the reactor. Various means may be used to observe the temperatures of the bottom ends of the fuel elements. For example, thermocouples, such as thermocouple 27 illustrated in Figure 2, may be arranged to contact the bottom of each fuel element cup when the fuel element is inserted into the reactor core from above. The thermocouple leads 28 can be taken through suitable hermetic seals in the reactor enclosure 29 and fed to a display board.

Thus, in utilizing a thermal indication, in accordance with the practice of this invention, to transmit information corresponding to the characteristics of the fuel elements, no electrical leads, pneumatic or hydraulic tubing, or mechanical fixtures are actually fastened to each fuel element. This permits the fuel elements to be changed easily.

Also, definite knowledge of which fuel element has ruptured or is otherwise unsatisfactory for continued service can save considerable time during reactor shutdown. Such knowledge permits immediate replacement of defective elements and no time need be lost in extensive inspection during reactor shutdown.

The temperature of the ends of the fuel elements may be determined optically. An example of a fuel element incorporating this invention wherein the temperatures of the bottom ends of the fuel elements are optically monitored is illustrated in Figure 3.

Components in Figure 3 similar to those illustrated in Figure 2 are designated by the same reference numerals. There is illustrated a transparent window 32 in the reactor enclosure 29, a radiation converter 33, and optical prism 34. This optical system permits viewing, from a point 35, the bottom surface 19' of fuel element cup 19. The end of cup 19 is surrounded by a transparent insulating material shield 36. For example, this insulating material can be fused quartz which shields the cup 19 from the coolant so that changes in the resistance to heat flow between plug extension 23' and cup 19 are readily detectable from the temperature of end face 19' and not substantially dissipated by the coolant. The necessity for shield 36 is determined by the ambient temperature of and the rate of flow of the coolant in the vicinity of cup 19 relative to the normal operating temperature of the fuel element.

If the reactor is of the boiling water type, the temperature of end face 19' may not be sufficiently high to permit ready detection of temperature changes. In such an application, radiation converter 33, for example, an infrared detector, may be inserted in the line of sight to permit appropriate visual inspection.

If the reactor is cooled with a fluid other than water, for example, gas, the operating temperature of the fuel elements may be such that the temperature of end face 19' is in the visual range so that radiation converter 33 is not necessary.

Thus, the apparatus illustrated in Figure 3 permits monitoring of the bottom of the fuel elements by interpretation of the color of end face 19'. No wires or other attachments are necessary to be brought through the reactor enclosure and visible temperature can be viewed directly through conventional periscope apparatus. The operator obtains a complete view of the bottom ends of the elements. If burnup of the fuel elements is approximately uniform, the graduation of color will likewise be uniform. However, if one or more of the elements has achieved a greater percentage of burnup or is otherwise defective, the end face 19' of the cup for this element will appear brighter in comparison to the other elements.

Also, fuel element cladding failure causes a large change in temperature and any element which has so failed is immediately apparent to the operator. The general level of brightness of the end faces 19' of the cups for the entire bank of elements increases during the life span of the elements. Therefore, the sensitivity of detection tends to be greatest at the end of the fuel element life period when fuel element failure is most likely and high sensitivity is most needed.

It will be readily apparent that this invention has been described in connection with the monitoring of nuclear fuel elements merely by way of example. Also, it will be apparent that the practice of this invention can be applied to substantially any measurement problem wherein a change in characteristics is manifested by a dimensional change.

While the practice of this invention has been described in connection with specific applications, it will be readily apparent to those skilled in the art that it is subject to a wide variety of modifications and applications. Therefore, it is intended in the appended claims to cover all modifications and variations coming within the true spirit and scope of this invention.

What is claimed is:

1. An apparatus for measuring the dimensions of an object subject to heating and changes in physical dimension which comprises means for securing one portion of said object in a fixed position leaving a second portion free to move under such dimensional changes, and temperature detecting means subject to cooling disposed in a fixed position with an area of its surface in immediate proximity and in heat transfer relation to an area of only the movable second portion of said object, whereby the heat transfer area and the resistance to heat flow between the second portion of said object and said temperature detecting means are variable and determined by the relative positions thereof, and whereby the temperature of said temperature detecting means is a function of the dimension of said object.

2. An apparatus according to claim 1 wherein part of said temperature detecting means includes a hollow heat conducting means into and partially through which the movable second portion of said object extends.

3. An apparatus according to claim 1 wherein said object comprises a nuclear reactor fuel element containing fissionable material and subject to irradiation damage and dimensional elongation with use in a nuclear reactor.

4. An apparatus for measuring at least one dimension of an object subject to heating which comprises temperature detecting means disposed in substantially fixed relationship with respect to one portion of said object and in a movable heat transfer relationship with respect to a second portion of the object, said movable heat transfer relationship being such that only the area of the surface of said second portion of said object is immediately adjacent an area of the surface of said detecting means whereby the area of said surfaces and the resistance to heat flow therebetween are variable with changes in at least one dimension of said object to provide a temperature at said detecting means which is a function of said dimension.

5. An apparatus for measuring at least one dimension of an elongated object subject to heating which comprises temperature detecting means including hollow heat conducting means, heat transfer means connected to said object and extending only part way into said hollow heat conducting means, said heat transfer means being movable and thus positionable within said hollow heat conducting means in accordance with variations in at least one dimension of said object so that the immediately adjacent surface area open to heat transfer between said object and through said heat transfer and hollow heat conducting means to said temperature detecting means is variable with changes in said dimension and provides a temperature at said temperature detecting means which is characteristic of said dimension.

6. An apparatus for determining the condition of heated nuclear fuel; which apparatus comprises temperature detecting means including hollow heat conducting means, heat transfer means maintained in contact with said fuel and extending only part way into said hollow heat conducting means in heat transfer relationship to said temperature detecting means, the position of said heat transfer means within said hollow heat conducting means and the area of the immediately adjacent surfaces thereof being variable in accordance with changes in at least one dimension of said fuel so that the area open to heat flow between said adjacent surfaces and therefore the resistance to heat flow between said heated nuclear fuel and said temperature detecting means are variable with changes in said dimension to provide a thermal indication of the condition of the nuclear fuel.

7. An apparatus for determining the condition of heated nuclear fuel by measuring at least one dimension of the nuclear fuel, which apparatus comprises temperature detecting means including hollow heat conducting means, heat transfer means maintained in contact with said fuel and extending only part way into said hollow heat conducting means in heat transfer relationship to said temperature detecting means so that the position of said heat transfer means within said hollow heat conducting means and the area of the immediately adjacent surfaces thereof are variable in accordance with changes in at least one dimension of said fuel whereby the area open to heat flow between said adjacent surfaces and therefore the resistance to heat flow between said heated nuclear fuel and said temperature detecting means are variable with changes in said dimension, said temperature detecting means including thermoelectric apparatus to provide a remote indication of the condition of the nuclear fuel.

8. An apparatus for determining the condition of heated nuclear fuel by measuring at least one dimension of the nuclear fuel, which apparatus comprises temperature detecting means including hollow heat conducting means, heat transfer means maintained in contact with said fuel and extending only part way into said hollow heat conducting means in heat transfer relationship to said temperature detecting means so that the position of said heat transfer means within said hollow heat conducting means and the area of the immediately adjacent surfaces thereof are variable in accordance with at least one dimension of said fuel whereby the area open to heat flow between said adjacent surfaces and therefore the resistance to heat flow between said heated nuclear fuel and said temperature detecting means are variable with changes in said dimension, said temperature detecting means including optical means to provide a remote indication of the condition of the nuclear fuel.

References Cited in the file of this patent

UNITED STATES PATENTS

| | | |
|---|---|---|
| 1,405,832 | Gentzel | Feb. 7, 1922 |
| 1,672,229 | Pairman | June 5, 1928 |
| 1,824,988 | French et al. | Sept. 29, 1931 |
| 2,114,029 | Perry | Apr. 12, 1938 |
| 2,627,182 | Quereau et al. | Feb. 3, 1953 |

OTHER REFERENCES

Proceedings of the International Conference on the Peaceful Uses of Atomic Energy, Aug. 8–20, 1955, vol. 2, pages 311 and 460.